United States Patent [19]

Ansel et al.

[11] Patent Number: 5,737,612

[45] Date of Patent: Apr. 7, 1998

[54] POWER-ON RESET CONTROL CIRCUIT

[75] Inventors: George M. Ansel, Starkville; Jeffery Scott Hunt, Ackerman, both of Miss.; Christopher W. Jones, Pleasanton, Calif.; Jeffery Mark Marshall; Hatem Yazbek, both of Starkville, Miss.

[73] Assignee: Cypress Semiconductor Corp., San Jose, Calif.

[21] Appl. No.: 316,121

[22] Filed: Sep. 30, 1994

[51] Int. Cl.$^6$ ............................................. G06F 1/30
[52] U.S. Cl. ................................. 395/750.01; 327/143
[58] Field of Search ........................ 395/750; 327/143

[56] References Cited

U.S. PATENT DOCUMENTS

| | | |
|---|---|---|
| 5,237,219 | 8/1993 | Cliff. |
| 5,243,233 | 9/1993 | Cliff. |
| 5,477,176 | 12/1995 | Chang et al. ............................ 327/143 |

Primary Examiner—Gopal C. Ray
Assistant Examiner—David A. Wiley
Attorney, Agent, or Firm—Blakely, Sokoloff, Taylor & Zafman LLP

[57] ABSTRACT

A power-on reset control circuit and associated method for deactivating a global power-on-reset signal based on whether circuitry, critical to correct functionality of an electronic system employing the power-on reset, is functioning correctly. The power-on reset control circuit comprises a control emulation circuit for transmitting a control signal through a first control line to indicate that the circuitry is operating correctly. The power-on reset control circuit further comprises a control verification circuit, coupled to the control emulation circuit through the first control line, for deactivating the global power-on reset signal upon receiving an active local power-on reset signal indicating that the power source is providing a voltage at an operating threshold level and the active control signal from the control emulation circuit.

7 Claims, 12 Drawing Sheets

POWER-ON RESET CONTROL CIRCUIT

BACKGROUND OF THE INVENTION

1. Field of the Invention

The present invention relates to the field of integrated circuits. More specifically, the present invention relates to an integrated circuit which temporarily precludes the deactivation of a power-on-reset signal until a power supply achieves a selected threshold voltage level and certain integrated circuits are functioning correctly. The method for controlling the power-on-reset signal comports with the operations of the circuit.

2. Background Art Relating to the Invention

Traditionally, an electronic system usually comprises a number of integrated circuits critical to the operation of the electronic system. These critical integrated circuits are powered by a common power source having a steady-state operating voltage "$V_{cc}$" (normally five Volts). During a power-up cycle of the electronic system, the power source supplies a voltage at a selected ramp rate ("$V_s$") to the critical integrated circuits until $V_s$ is equal to $V_{cc}$. Concurrently, upon reaching a first trip voltage referred to as "$V_1$" during the power-up cycle, a local power-on-reset ("POR") circuit within the electronic system activates a POR signal which is used to initialize macrocells, flip-flops, registers, latches and other well-known circuitry within the electronic system.

When $V_s$ reaches a second trip voltage referred to as an operating threshold voltage "$V_{th}$" (normally less than $V_{cc}$), the conventional POR circuit deactivates the POR signal to enable the integrated circuit to operate without threat of being re-initialized by the conventional POR circuit. The operating threshold voltage "$V_{th}$" is calculated as the theoretical voltage necessary for all of the critical integrated circuits within the electronic system to operate.

One disadvantage associated with the conventional POR circuit is based solely on the voltage being transmitted by the power source. As a result, upon reaching $V_{th}$, the conventional POR circuit deactivates the POR signal assuming that all of the critical integrated circuits are operating properly. However, since capacitance ratios for signal lines within the electronic system differ, certain inputs propagating through these signal lines fail to closely track each other with respect to the power source. Thus, it is possible that some critical integrated circuits may not have been powered up correctly before the POR signal is deactivated. For example, if $V_{th} \ll V_{cc}$, the conventional POR circuit may prematurely deactivate the POR signal before all critical integrated circuits are operational. Additionally, if $V_{th} \approx V_{cc}$, the conventional POR circuit is susceptible to unwanted resetting due to noise from the power source.

As a result, different approaches have been employed to delay the deactivation of the POR signal. For example, well-known RC circuits are commonly used for delay purposes. Another example of delaying the deactivation of the POR signal is to connect a SRAM cell serially to the POR signal line in order to preclude the POR signal from being deactivated until the SRAM cell is operational. However, there are a number of disadvantages associated with this delay mechanism.

One disadvantage associated with this delay mechanism is that it does not ensure that circuits, which operate independently of the POR signal such as, for example sense amplifiers, are functioning correctly before the POR signal is deactivated. Thus, there still exist many potential occurrences when the POR signal is deactivated prematurely.

A second disadvantage associated with the above-identified circuit is that it does not provide a means for sampling logic states of multiple integrated circuits employed within the electronic system to ensure that each integrated circuit is operating correctly. Another disadvantage is that it does not control power-up current surges since all of its circuits are powered simultaneously.

Based on the foregoing, it would be desirable to design a power-on reset control circuit overcoming the above-listed disadvantages. Therefore, it is an object of the present invention to provide a circuit and method for employing circuits which are independent of the POR signal to perform partial control of the deactivation of the POR signal.

It is another object of the present invention to be able to sense correct operation of multiple circuit types with different logic states for each circuit type.

It is yet another object of the present invention which provides sequencing of the power-on resetting of multiple circuits to limit power supply current surges.

SUMMARY OF THE INVENTION

The present invention relates to the field of integrated circuits. More specifically, the present invention relates to an integrated circuit which temporarily precludes the deactivation of a global power-on-reset signal until a power source achieves an operating threshold voltage level and certain integrated circuits whose operation is independent from the global power-on reset signal are functioning correctly. The power-on reset control circuit comprises a control emulation circuit for transmitting a control signal through a first control line to indicate that the circuitry is operating correctly. The control emulation circuit includes circuitry which emulate responses of these critical integrated circuit(s). Thus, when the circuitry is operational, the critical integrated circuits are also operational.

The power-on reset control circuit further comprises a control verification circuit, coupled to the control emulation circuit through the first control line, for deactivating the global power-on reset signal upon receiving an inactive local power-on reset signal indicating that the power source is providing a voltage at an operating threshold level and the inactive control signal from the control emulation circuit. The control verification circuit includes a power-on reset generation circuit and a logic element having a first and second input ports. The power-on reset generation circuit (i) activates a local power-on reset signal upon detecting that the power source is providing voltage at a predetermined level and (ii) deactivates the local power-on reset signal upon detecting that the power source is providing the operating threshold voltage. The power-on reset generation circuit is coupled to the first input port of the logic element through a local power-on reset line for enabling transmission of the local power-on reset signal thereto and the control emulation circuit is coupled to the second input port through the first control line.

The method for ensuring that a global power-on reset signal is properly deactivated comprises at least five primary steps. The first step is for the power-on reset control circuit to monitor the power source following power-up. Upon determining that the power source is producing the predetermined voltage, the power-on reset control circuit activates a global power-on reset signal to reset a first plurality of integrated circuits. The third step is for the power-on reset control circuit to determine whether above-identified emulation circuitry is operating correctly. If so, the power-on reset control circuit determines whether the power source is producing the operating threshold voltage. The final step is for the power-on reset control circuit to deactivate the global power-on reset signal if both the emulation circuitry is operating correctly and the power source is producing the operating threshold voltage.

BRIEF DESCRIPTION OF THE DRAWINGS

The objects, features and advantages of the present invention will become apparent from the following detailed description of the present invention in which.

DETAILED DESCRIPTION OF THE PRESENT INVENTION

In the following description, a circuit and method are described for controlling the activation of a global power-on reset POR signal to indicate that an electronic component is powering-up and the deactivation of the global POR signal to indicate that both the power source has reached an operating threshold voltage and certain critical integrated circuits necessary for the proper operation of the electronic component are operating as intended. In the following description, for purposes of explanation, specific details are set forth in order to provide a thorough understanding of the present invention. It should be borne in mind that the present invention may find wide application besides controlling the global POR signal of a programmable logic device ("PLD") based on correct operations of sense amplifiers.

In the detailed description, a number of terms and symbols are frequently used to describe and represent characteristics of inputs described herein. With respect to signal representations, a term "high" is representative of and interpreted by integrated circuit gates as a logic level "1" having a voltage normally between 3–5 Volts, inclusive. Similarly the term "low" is representative of and interpreted by integrated circuit gates as a logic level "0" having a voltage normally between 0–2 Volts, inclusive. A "product" signal is a resultant signal from a logical AND'ing of at least two other signals. A "sum-of-product" signal is a resultant signal from a logical OR'ing of a number of product signals. A "pattern" is a combination of "high" and "low" logic states.

Figure 1:
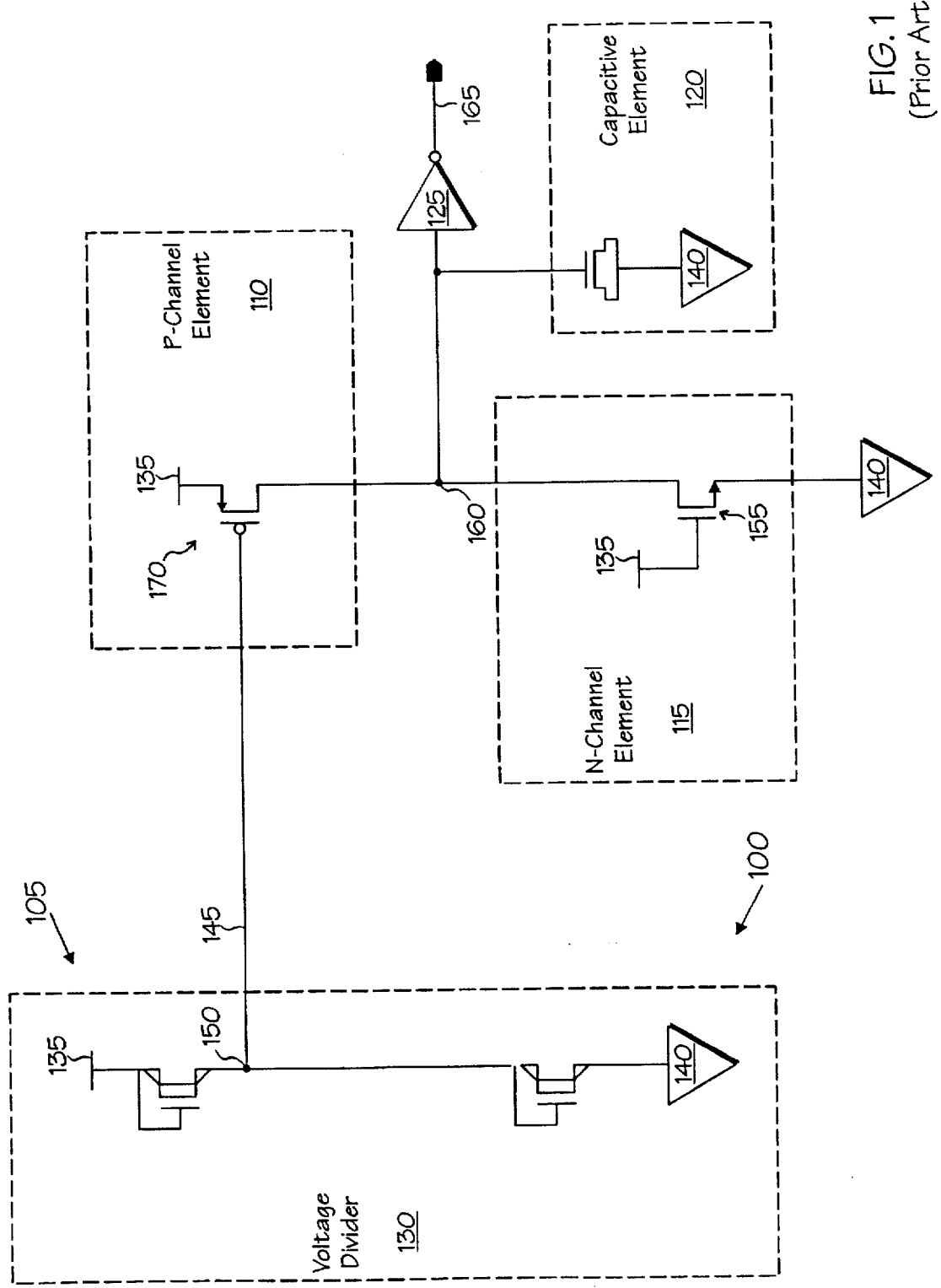
FIG. 1 is a schematic diagram of a conventional power-on reset circuit.

Referring to FIG. 1, an illustrative embodiment of a conventional power-on reset ("POR") circuit is illustrated. The conventional POR circuit 100 comprises a voltage divider 105, p-channel element 110, n-channel element 115, a capacitive element 120 and an inverter 125, all of which are coupled together as illustrated. During the power-up cycle, a common power source 135 provides "$V_s$" to the voltage divider 105 at the selected ramp rate. Well known to those skilled in the art, the voltage divider 105 includes at least a pair of diode-connected n-channel depletion transistors 130 coupled between the power source 135 and a common ground 140, typically referred to by its ground potential ("GND") of approximately zero Volts. The voltage divider 105 transfers a predetermined percentage of $V_s$, referred to as "$V_{pc}$", through a first output signal line 145 and into the p-channel element 110. The first output signal line 145 is coupled to the voltage divider 105 at a first node 150.

Concurrently with the operations of the voltage divider 105, a gate of a n-channel transistor 155 forming the n-channel device 115 receives $V_s$ from the power source 135 to establish an input path from GND 140, through the n-channel transistor 155, and into a second node 160 coupled to an input of the inverter 125. Once $V_s$ is equal to a first level ("$V_1$"), being a voltage level necessary for the inverter 125 to function properly, a power-on-reset cycle begins. The inverter 125 first inverts the ground potential into a "high" signal, referred to as an active local POR signal, and outputs the active local POR signal through a local POR signal line 165 to the circuitry that is being reset on power-up.

As $V_s$ ramps up and reaches $V_{th}$, the p-channel device 110, employing at least one p-channel transistor 170 coupled between the power source 135 and the second node 160, establishes a conduction path between the first and second nodes 135 and 160. As a result, the second node 160 is pulled "high" so that the inverter 125 receives a "high" input. However, the second node 160 is not pulled "high" immediately, but instead after a particular delay due to the presence of the n-channel device 115 and the capacitive element 120. The charging of the capacitor element 120 is regulated both by the current supplied by p-channel element 110 and the current removed by the n-channel element 115. The power-on-reset cycle is terminated when the second node 160 reaches logic "1".

Figure 2:
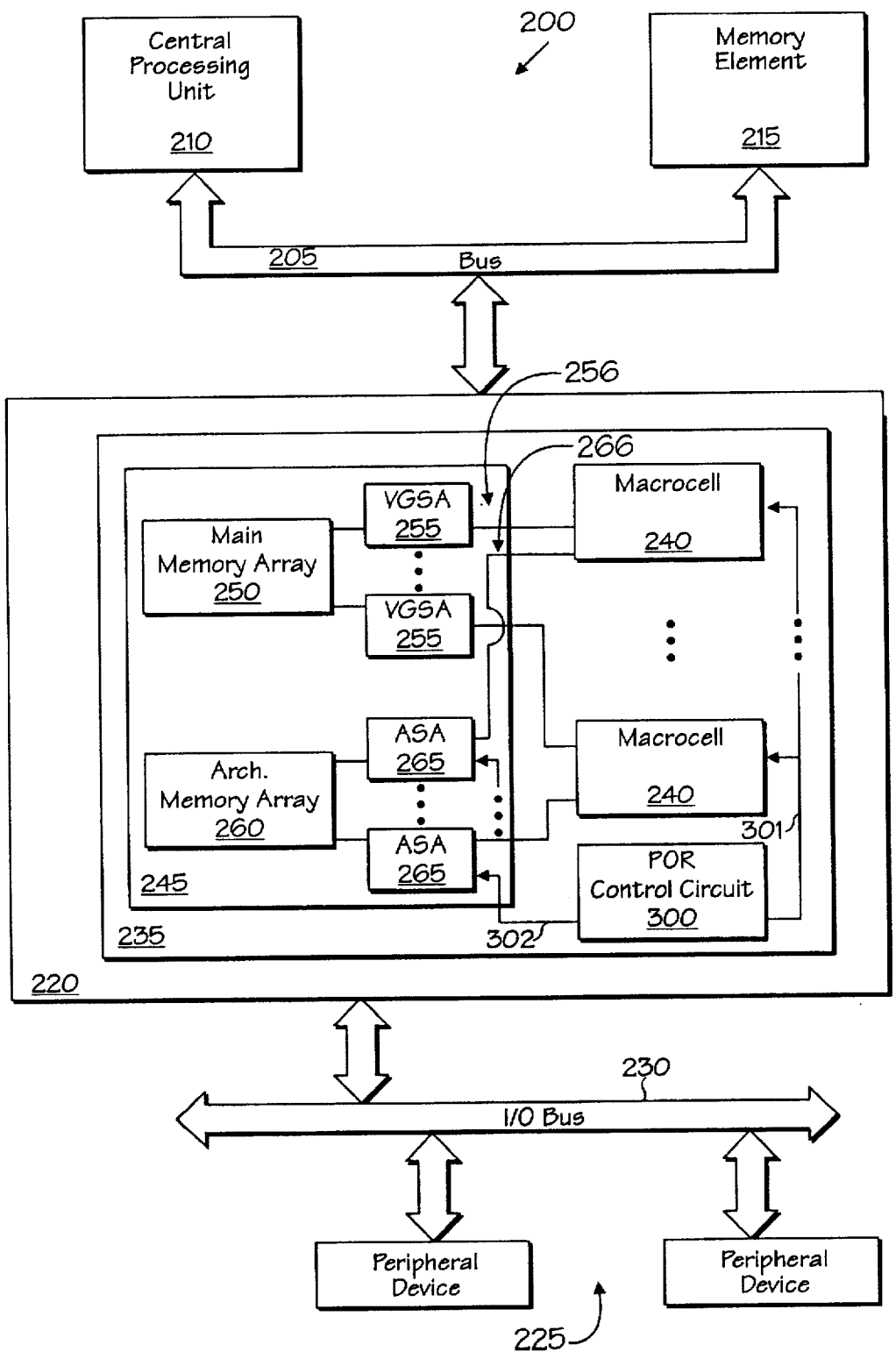
FIG. 2 is a block diagram of a computer system including a CPU, memory and an I/O controller, wherein the I/O controller comprises a programmable logic device employing a power-on reset control circuit.

Referring now to FIG. 2, an illustrative embodiment of a computer system 200 utilizing the present invention is shown. The computer system 200 generally comprises a bus 205 including address, data and control interconnect lines enabling information to be exchanged between a plurality of bus agents including a central processing unit 210, a memory element 215 and a controller 220. The controller 220 provides a gateway for information transmitted between a selected bus agent and one of several peripheral devices 225 coupled to a second bus 230. It is contemplated that the peripheral devices 225 may include a display, an alphanumeric keyboard, a cursor control device, a mass data storage device, a printing device, a facsimile machine and the like. It is further contemplated that the controller 220 may include a programmable logic device ("PLD") 235 such as a complex programmable logic device (Part No. 7C371 or 7C375)

manufactured by Cypress Semiconductor Incorporated of San Jose, Calif.

Being well-known in integrated circuit technology, the PLD 235 includes a plurality of macrocells 240, programmable arrays 245 and a power-on reset control circuit 300. The programmable array 245 includes a main memory array 250, virtual ground sense amplifiers ("VGSAs") 255, an architecture memory array 260 and architecture sense amplifiers ("ASAs") 265. The main memory array 250 includes programmable memory cells which may or may not be programmed depending on a chosen pattern. The VGSAs 255 are used to sense a number of the memory cells forming the pattern while the architecture memory array 260 and the ASAs 265 control the configuration of the macrocells used for transferring data to or from the main memory array 250. Such sensing and configuring is accomplished through multiple bit-wide buses 256 and 266, respectively. For example, the macrocells for the 7C371 can be configured for latched, registered, combinatorial, active low/high clock polarity and other modes of operation. These particular configurations of the macrocells are arbitrarily selected by the user and the architecture memory array 260 is programmed to provide this particular configuration.

The power-on reset control circuit 300 is coupled to the macrocells 240 through a global POR control line 301 for resetting these macrocells 240 through the activation and deactivation of a global $\overline{POR}$ signal. The power-on reset control circuit 300 is further coupled to the ASAs 265 through a second control line 302 to activate an architecture power-on-reset ("ARPOR") signal to ensure proper operation of the ASAs 265. In order to ensure that the VGSAs and ASAs are operating correctly and, therefore, that the macrocells are reset correctly on power-up, the termination of the power-on-reset cycle (i.e., the deactivation of power-on reset signal) must be after the VGSAs and ASAs are operating correctly.

Figure 3:
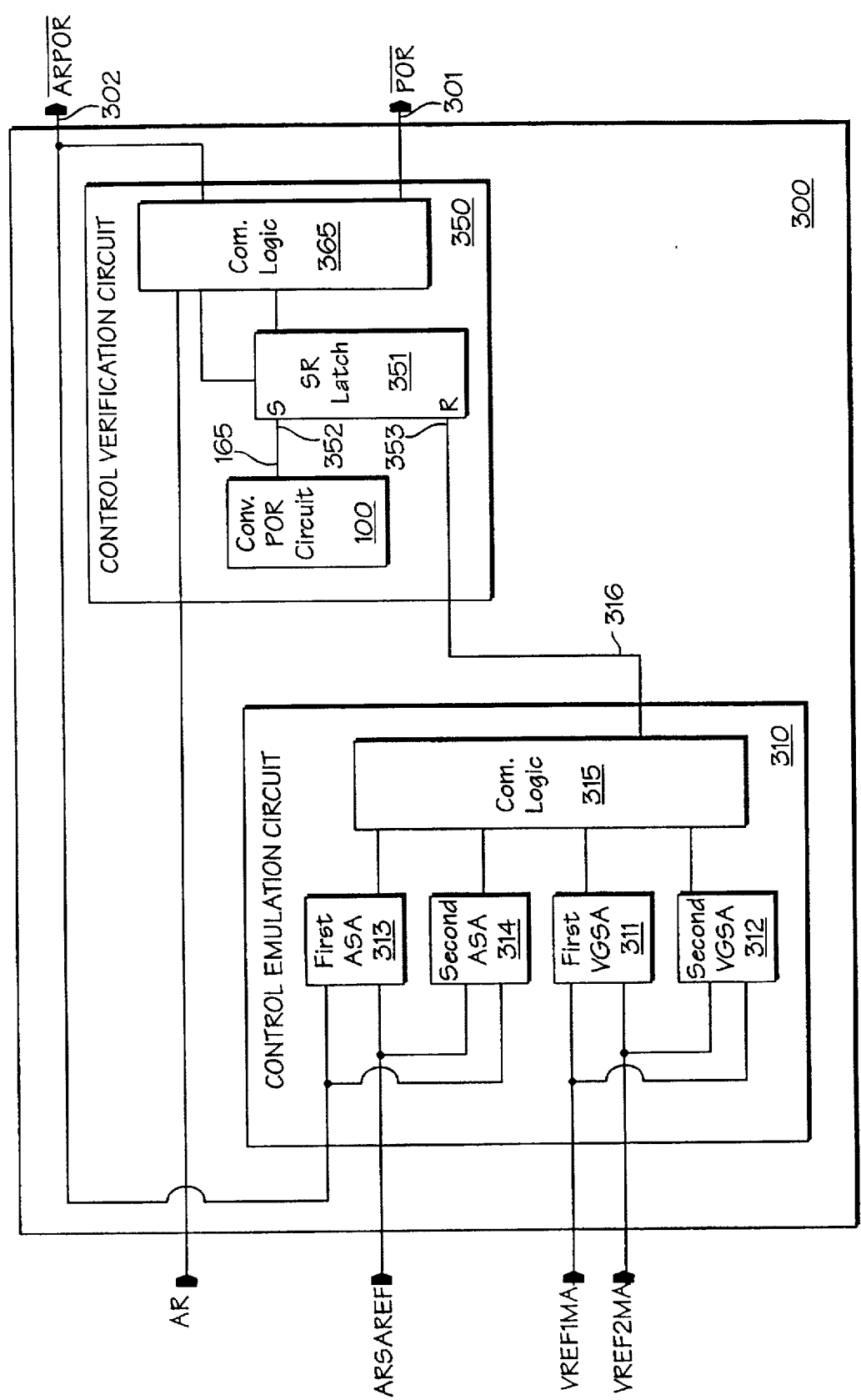
FIG. 3 is a schematic diagram of a first embodiment of the power-on reset control circuit comprising a control emulation circuit and a control verification circuit.

Referring now to FIG. 3, an illustrative embodiment of the power-on reset control circuit 300 is shown, wherein the power-on reset control circuit 300 includes a control emulation circuit 310 and a control verification circuit 350. The control emulation circuit 310 is configured to emulate responses of any critical integrated circuit(s) whose operation is independent from the global POR signal. For this embodiment, for example, the critical integrated circuits are (i) a first: VGSA 311 representing a VGSA to a programmed memory cell; (ii) a second VGSA 312 representing a VGSA coupled to an unprogrammed memory cell; (iii) a first ASA 313 representing an ASA coupled to a programmed memory cell; and (iv) a second ASA 314 representing an ASA coupled to an unprogrammed memory cell. These four different types of sense amplifiers represent every configuration of the VGSAs and ASAs because the VGSAs respond differently than ASAs during the power-up cycle and sense amplifiers associated with programmed memory cells output different logic states than those associated with unprogrammed memory cells.

For this embodiment, the first and second VGSAs 311 and 312 receive as input a plurality of control signals. As shown, a first and second voltage reference inputs, labeled "VREF1MA" and "VREF2MA", are transmitted from a global VGSA reference voltage generator into both VGSAs 311–312. The VREF1MA and the VREF2MA inputs are set to a specific voltage level to improve performance of the VGSAs 311 and 312 as discussed in FIG. 6. Similarly, both ASAs 313 and 314 receive as input a plurality of control signals; namely an architecture sense amplifier reference voltage ("ARSAREF") signal and feedback from an architecture power-on-reset ("ARPOR") signal. The ARSAREF signal determines the operating point of the transistors in the ASAs 313 and 314. The $\overline{ARPOR}$ signal establishes a conduction path to the common power source during power-up to ensure the ASAs 313 and 314 latch the correct states as shown in FIG. 7. Both pairs of VGSAs and ASAs 311–314 are coupled to a first combinatorial logic circuit 315 which outputs an active-low, sense amplifier power-on-reset ("$\overline{SAPOR}$") signal into the control verification circuit 350 via a control emulation output line 316, provided each of these sense amplifiers 311–314 is operating correctly.

Referring still to FIG. 3, the control verification circuit 350 is configured to continue the power-on-reset cycle until all of the critical circuits (i.e., the VGSAs and ASAs 311–314) are operating correctly. This is accomplished by coupling the local POR signal line 165 of the conventional POR circuit 100 (shown in FIG. 1) to a "set" input port 352 of an asynchronous set-reset ("SR") latch 351 and coupling the emulation output line 316 of the control emulation circuit 310 to a "reset" input port 353 of the SR latch 351. By doing so, the SR latch 351 outputs an active global POR signal which is transformed into an active-low global $\overline{POR}$ signal by a second combinatorial logic circuit 365 once the conventional POR circuit 100 detects that $V_s$ reaches $V_1$. The SR latch 351 now continues to activate the global POR signal until two conditions are met; namely, the conventional POR circuit 100 deactivates the local POR signal propagating through the local POR signal line 165 and the control emulation circuit 310 deactivates the $\overline{SAPOR}$ signal propagating through the control emulation signal line 316.

The control verification circuit 350 further receives as input an architecture sense amplifier read ("AR") input from control logic on the PLD 235 of FIG. 2. The AR signal is "low" (logic "0") during power-on reset. The AR signal is used to force a read of the ASAs on the PLD when desired, for example after programming the memory locations and prior to returning to normal PLD operation. Since the AR signal is "low" during the power-on reset cycle, the $\overline{ARPOR}$ signal is simply the complement of the conventional POR circuit output 165 of FIG. 1 during this time. The $\overline{ARPOR}$ signal forces the ASAs 313 and 314 to be read to obtain the current output states on the ASAs 313 and 314 in the control emulation circuit 310.

Figure 4:
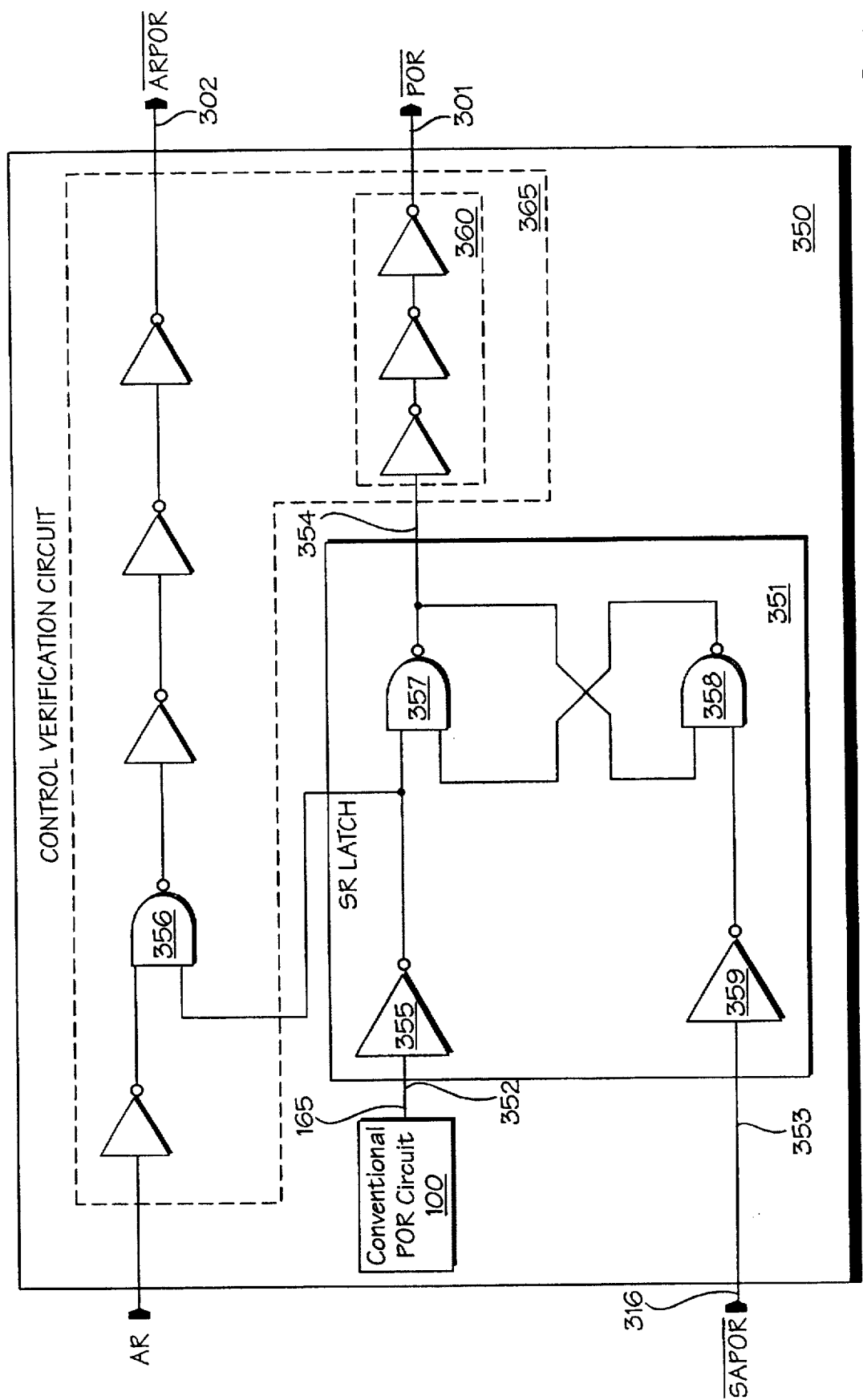
FIG. 4 is a detailed schematic diagram of the control verification circuit of FIG. 3.

Referring now to FIG. 4, one embodiment of the control verification circuit 350 of the power-on reset control circuit 300 is illustrated. The control verification circuit 350 comprises the SR latch 351 having the "set" and "reset" input ports 352 and 353 and at least a first output port 354. The conventional POR circuit 100 is coupled to the "set" input port 352 of the SR latch 351 through the local POR signal line 165 and the control emulation circuit 310 is coupled to the "reset" input port 353 via the control emulation signal line 316. The set input port 352 is coupled to an input of a first SR inverter 355 which, in turn, is coupled in series to a second input of a first NAND gate 356 and a first input of a master NAND gate 357 being "cross-coupled" with a slave NAND gate 358 (i.e., the output of the master NAND gate 357 is coupled to a first input of the slave NAND gate 358 and the output of the slave NAND gate 358 is coupled to a second input of the master NAND gate 357). The second input of the slave NAND gate 358 is coupled to a second SR inverter 359 which receives as input the $\overline{SAPOR}$ signal through the control emulation signal line 316.

Based on this illustrative embodiment, during the power-up cycle, as the common power source ramps up to $V_1$ to begin the power-on reset cycle (a subcycle of the power-up cycle), the conventional POR circuit 100 transmits an active local POR signal ("high") into the set input port 352 of the SR latch 351. The local POR signal is inverted by the first SR inverter 355 and input into the first input of the master NAND gate 357 and the second input of the first NAND gate 356. Since the local POR signal is input into the set input port 352 of the SR latch 351 which has precedence over the $\overline{\text{SAPOR}}$ signal input into the reset input port 353, the SR latch 351 produces an active global POR signal ("high") through the first output port 354. The active global POR signal propagates through a number of inverters in series 360 for buffering and complementing the global POR signal for transmission to circuit elements that are being reset at power-up (e.g., macrocells in a PLD). This begins the power-on-reset cycle.

In the event that the conventional POR circuit 100 detects Vs reaching Vth before the critical integrated circuits (VGSAs and ASAs) are operating correctly, the conventional POR circuit 100 deactivates the local POR signal. The deactivated local POR signal ("low") is inverted by the first SR inverter 355 and input into the master NAND gate 357. However, until the $\overline{\text{SAPOR}}$ is deactivated (i.e., pulled to logic "1"), the SR latch 351 continues to out-put the active global POR signal ("high") because the second input of the master NAND gate 357, output of slave NAND gate 358, remains "low".

Alternatively, in the event that the critical integrated circuits, namely the VGSAs and ASAs 311–314 within the control emulation circuit of FIG. 3, are operating correctly before Vs reaches Vth, the $\overline{\text{SAPOR}}$ signal is deactivated ("high"). However, until both the local POR signal and $\overline{\text{SAPOR}}$ signal are deactivated, the output of the master NAND gate 357 continues to output the active global POR signal ("high") from the output port 354 because the first input of the master NAND gate 357 remains "low".

Figure 5:
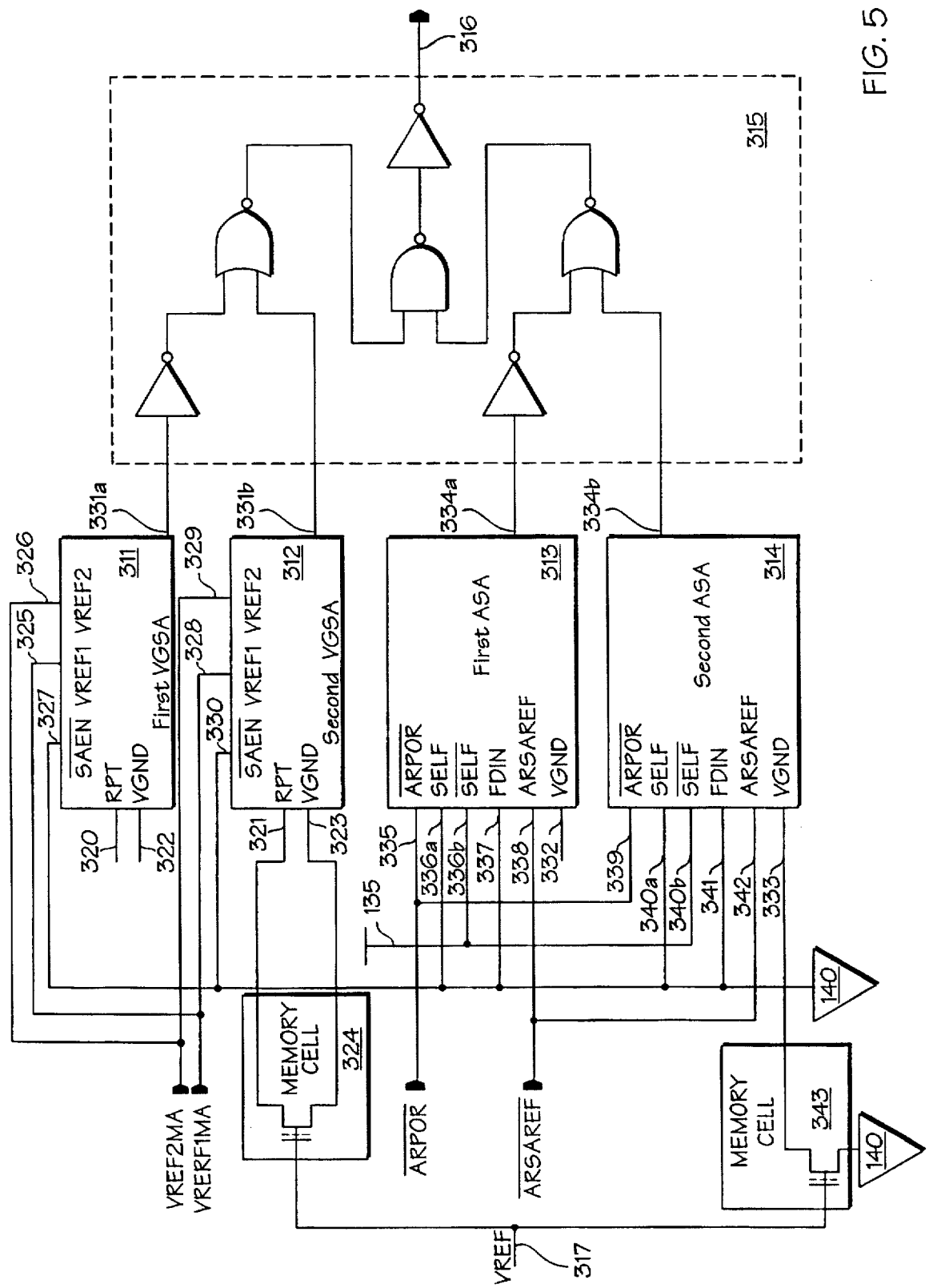
FIG. 5 is a detailed schematic diagram of the control emulation circuit of FIG. 3 including virtual ground sense amplifiers ("VGSAs") and architecture sense amplifiers ("ASAs") whose correct operations are critical to the operations of the programmable logic device of FIG. 2.

Referring to FIG. 5, one embodiment of the control emulation circuit 310 is illustrated. Identical to the VGSA circuits of the main memory array 250 of FIG. 2, the VGSAs 311 and 312 respectively emulate sensing of programmed and unprogrammed memory cells therein. Each VGSA 311 and 312 includes a read product term ("RPT") input port 320 and 321 and a virtual ground ("VGND") input port 322 and 323 as terminals for a memory cell which is sensed by internal circuitry within that VGSA 311 and 312 to determine whether the memory cell is programmed or unprogrammed. The first VGSA 311 has an open circuit between the RPT input port 320 and the VGND input port 322 to emulate a non-conductive programmed memory cell. The second VGSA 312 includes an unprogrammed memory cell 324 between its RPT and VGND input ports 321 and 323, wherein the unprogrammed memory cell 324 conducts current from the RPT 321 to the VGND 323 so that the second VGSA 312 senses an unprogrammed memory cell and outputs a correct logic state. The unprogrammed memory cell 324 receives reference voltage ("Vref") from source line 317.

Each of the VGSAs 311 and 312 further includes a plurality of control input ports and a single output port 331a and 331b coupled to the first combinatorial logic circuit 315. A first and second control input ports (labeled "VREF1" and "VREF2") 325–326 and 328–329 receive VREF1MA and VREF2MA voltage inputs, respectively. The VREF1MA and VREF2MA voltage inputs are used for improving the performance of the VGSAs by setting these voltage inputs so that the VGSA can sense a small input swing on their RPT input ports 320 and 321. A third control input port of both VGSAs 311 and 312 (labeled "$\overline{\text{SAEN}}$" 327 and 330, respectively) receives and inputs a sense amplifier enable signal which is deactivated to disable one or both of the VGSAs 311 and 312. In this embodiment, both VGSAs 311 and 312 are enabled since the $\overline{\text{SAEN}}$ input port is coupled to common GND 140.

Figure 11:
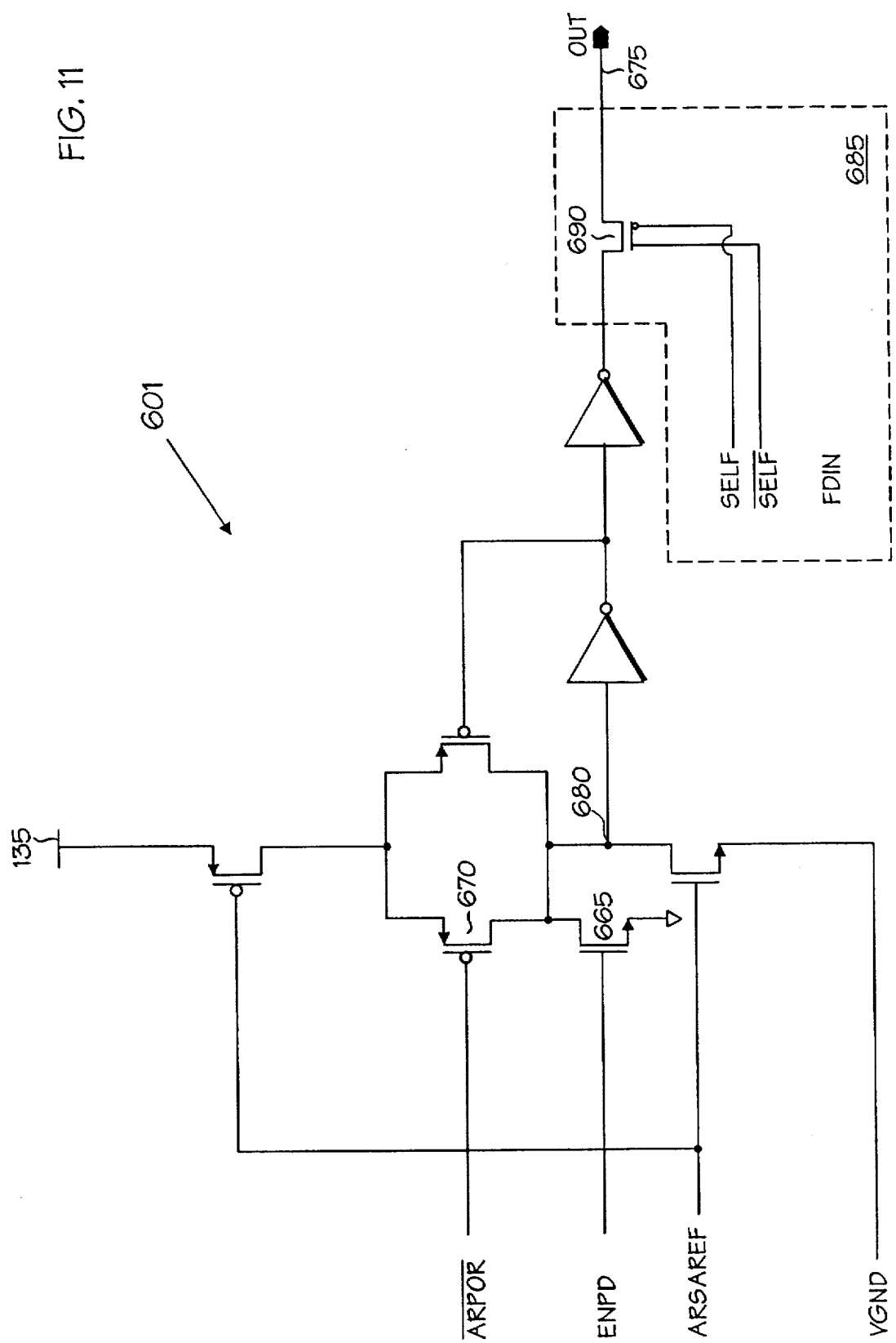
FIG. 11 is a detailed schematic diagram of an embodiment of the ASA implemented into the power-on reset control circuit of FIG. 9.

Identical to the ASAs employed in the PLD 235, the ASAs 313 and 314 emulate sensing of programmed and unprogrammed memory cells respectively, in the architecture memory array of FIG. 2. Each of the ASAs 313 and 314 include a virtual ground ("VGND") control input port 332 and 333. For the first ASA 313, the VGND input port 332 is disconnected to represent a programmed memory cell. However, for the second ASA 314, the VGND input port 333 is coupled to a first terminal for an unprogrammed memory cell 343 while common ground "GND" 140 is coupled to its second terminal. The first and second ASAs 313 and 314 further include a plurality of control input ports 335–338 and 339–342 for controlling the sense amplifier in correctly detecting the programmable state, especially the $\overline{\text{ARPOR}}$ and ARSAREF input ports 335, 338, 339 and 342 as shown in FIGS. 7 and 11.

Furthermore, the remaining control input ports are used for testing purposes for the ASAs 313 and 314. For example, the SELF and $\overline{\text{SELF}}$ input ports 336a, 336b, 340a and 340b of the ASAs 313 and 314 are activated during testing operations to alternatively force a logic state on the FDIN input ports 337 and 341 to output ports 334a and 334b, respectively, instead of the sense amplifier output data. As shown, the ASAs 313 and 314 are not in testing mode since the SELF and FDIN input ports 336a, 337, 340a and 341 are grounded and the $\overline{\text{SELF}}$ input ports 336b and 340b are coupled to the power source 135.

Once the VGSAs and ASAs are operating correctly, the control emulation signal line 316 deactivates the $\overline{\text{SAPOR}}$ signal. More specifically, the first VGSA and ASA 311 and 313 output a "high" signal into the first combinatorial logic circuit 315 and the second VGSA and ASA 312 and 314 output a "low" signal into the first combinatorial logic circuit 315. The outputs of the first and second VGSAs 311 and 312 and the outputs of the first and second ASAs 313 and 314 are effectively AND'ed to produce the $\overline{\text{SAPOR}}$ signal 316.

Figure 6:
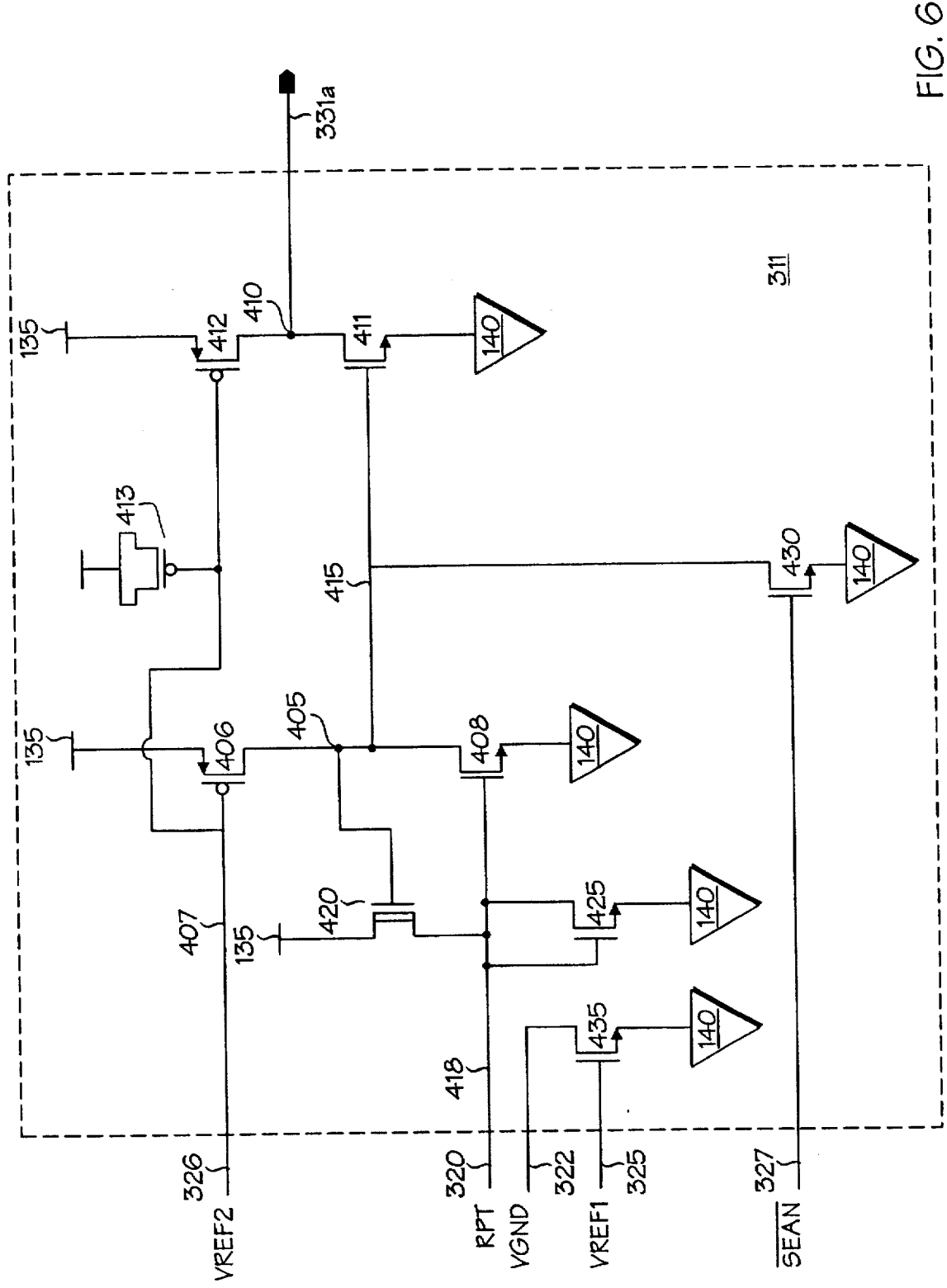
FIG. 6 is a detailed schematic diagram of an embodiment of the first VGSA of FIG. 5.
Figure 7:
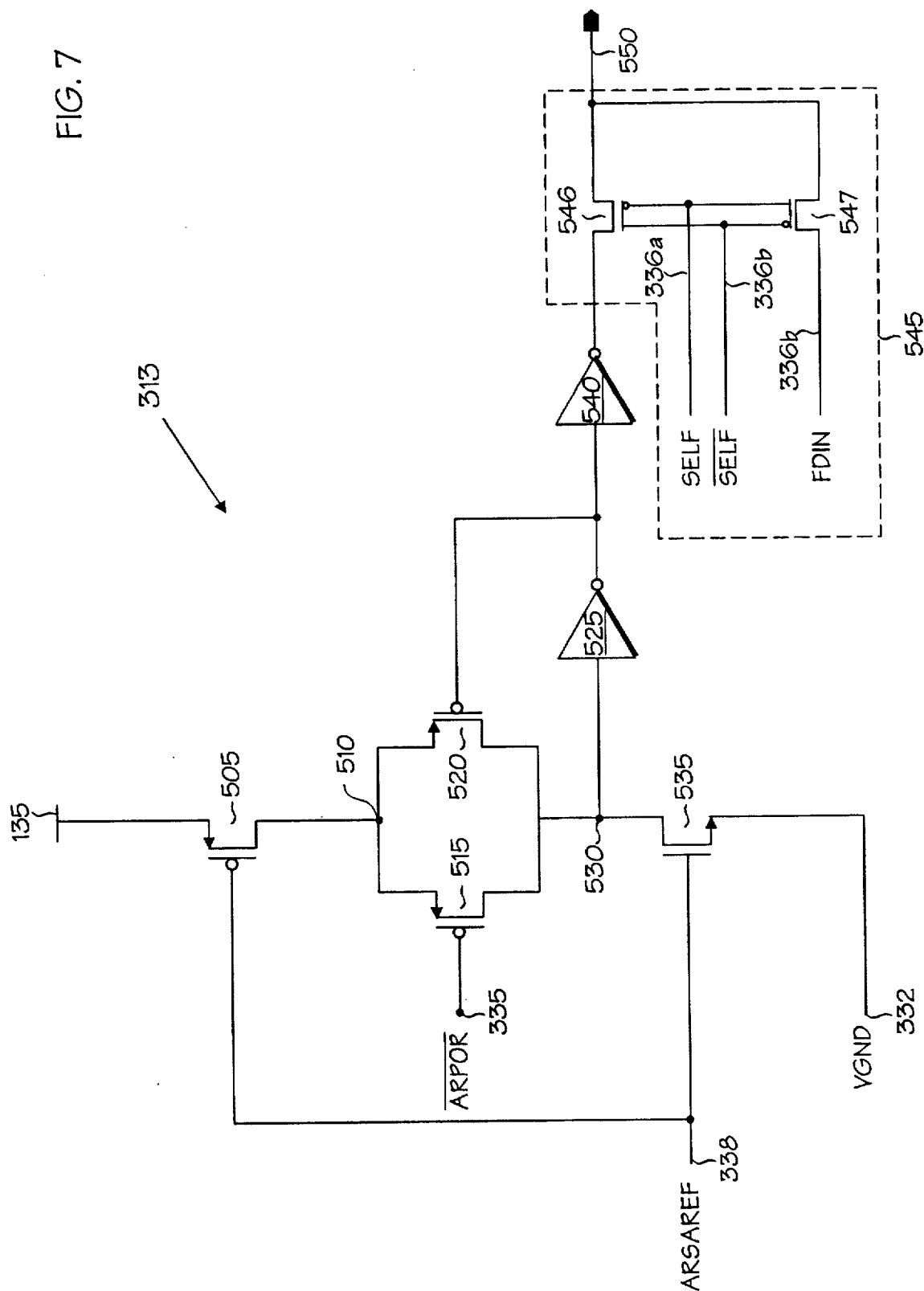
FIG. 7 is a detailed schematic diagram of an embodiment of the first ASA of FIG. 5.

Referring to FIG. 6, a schematic diagram of an embodiment of the first VGSA 311, identical to the second VGSA 312, is illustrated. The first VGSA 311 detects whether or not a memory cell, coupled between the RPT input port 320 and the VGND input port 322, is programmed or unprogrammed. Such detection is accomplished by circuitry internal to the first VGSA 311 for detecting the RPT input port 320 being pulled "low" because unprogrammed memory cells conduct. More specifically, since the VREF1 input port 325 receives the "high" VREF1MA voltage input, a fourth n-channel transistor 435 is activated forcing the VGND input port 322 "low". As in the second VGSA, however, if an unprogrammed memory cell is coupled between its RPT and VGND input ports, a conduction path is established between these two input ports thereby pulling its RPT input port 321 "low".

In this embodiment, the first VGSA 311 includes a pair of inverters 405 and 410 coupled in series through a first inverter output line 415. A first inverter 405 includes a first p-channel transistor 406 activated by the VREF2MA input transmitted into the VREF2 input port 326 through a first input line 407 and a first n-channel transistor 408 activated by a "high" logic level on the RPT input port 320. The VREF2MA input represents a "low" signal having an intermediate voltage between 1–3 Volts so that the first inverter 405 has a small input swing to support faster operations. The first inverter output line 415 is coupled to a second n-channel transistor 411 of a second inverter 410. Moreover, a second p-channel transistor 412 of the second inverter 410 is also coupled to the first input line 407 to be activated by the VREF2MA input. A p-channel capacitor 413 is coupled between the power supply 135 and the first input line 407 to improve tracking of the reference signal VREF2MA with the power supply.

In addition to the pair of inverters 405 and 410, there exist a number of n-channel transistors and an internal pull-up device 420 to control the output of the inverters 405 and 410. The internal pull-up device 420 is coupled to the first inverter output 405 to provide current to the RPT input port 320 if it is being pulled "low" by an unprogrammed memory cell. The combination of the transistors 435, 420, 408 and 406 provides negative feedback to the RPT input port 320 to limit its swing and improve performance. The transistor 425 provides a leakage path from the RPT input port 320 to GND 140 in the event that an unprogrammed memory cell is not connected between the RPT and VGND input ports 320 and 322.

Finally, the $\overline{SAEN}$ input port 327 is coupled to a gate of a fifth n-channel transistor 430 while its drain and source are coupled to the first inverter output line 415 and GND, respectively. By inputting a deactivated input ("high") into the $\overline{SAEN}$ input port 327, the fifth n-channel transistor 430 disables the VGSA for testing purposes.

Referring to FIG. 7, a schematic diagram of an embodiment of the first ASA 313 being employed in the control emulation circuit 310 is illustrated. Similar to the VGSA, the primary purpose of the ASA is to detect the type of memory cell (i.e., unprogrammed or programmed) coupled to the VGND input port 332. This can be accomplished by detecting whether the VGND input port 332 is being pulled "low". For the second ASA 314 as shown in FIG. 5, the VGND input port is coupled to the unprogrammed memory cell and a "low" signal is output by the second ASA 314. If the VGND input port 332 is not pulled "low", the ASA is coupled to a programmed memory cell (or disconnected as in the first ASA 313 of FIG. 5) and a "high" signal is output by the ASA.

Each of the first and second ASAs 313 and 314 comprises a first p-channel transistor 505 being coupled at its source to the common power source 135 and at its drain to a first node 510. The first p-channel transistor 505 is activated by the ARSAREF control input transmitted through the ARSAREF input port 338. The first node 510 is coupled to a second and third p-channel transistors 515 and 520 coupled in parallel to one another. The second p-channel transistor 515 is activated by the $\overline{ARPOR}$ control input from the $\overline{ARPOR}$ input port 335 while the third p-channel transistor 520 is coupled to an output of a first inverter 525. The second and third p-channel transistors 515 and 520 are coupled to a second node 530 which, in turn, is coupled to an input of the first inverter 525 and a drain of a first n-channel transistor 535. The first n-channel transistor 535 is also activated by the ARSAREF control input to establish a conduction path between the second node 530 and VGND input port 332.

The first inverter 525 is coupled in series with a second inverter 540 for buffering and proper polarity of the first ASA 313. The second inverter 540 is coupled to an override circuit 545 including a pair of CMOS transmission gates (n-channel and p-channel transistors coupled in parallel) 546 and 547 which are activated in the alternative by a select force ("SELF") input and its complement input ("$\overline{SELF}$"). Normally, the SELF and $\overline{SELF}$ inputs are both inactive so that the first CMOS transmission gate 546 is activated to propagate the signal being output from the second inverter 540 through a sensing output line 550. However, if testing is desired, the SELF and $\overline{SELF}$ inputs are activated which deactivates the first CMOS transmission gate 546 and activates the second CMOS transmission gate. As a result, a chosen state being supplied through a force data input ("FDIN") input propagates through the sensing output line 550.

As alluded to above, the ASA receives two inputs; namely the ARSAREF input and the $\overline{ARPOR}$ input. The ARSAREF input activates both the first p-channel and n-channel transistors 505 and 535. This is accomplished by maintaining the voltage of the ARSAREF input at an intermediate voltage level approximately equal to 2.5 Volts through the use of a voltage divider before being input into the ASA 313 or 314. The $\overline{ARPOR}$ input, however, is intermittently pulsed low to activate and deactivate the second p-channel transistor. When the $\overline{ARPOR}$ input is pulsed low, a conduction path is established from the power source 135, through the first and second p-channel transistors 505 and 515, the first n-channel transistor 535 and into the VGND input port 332 or 333.

For the first ASA 313, being coupled to a programmed memory cell as the first ASA 313 of FIG. 5, it operates as follows. When the $\overline{ARPOR}$ input port 335 receives a "low" pulsed input, a conduction path is established between the first and second nodes 510 and 530. Since there exists no conductive element (i.e., unprogrammed memory cell) coupled to the first ASA at the VGND port 332, the second node 530 is pulled "high". Since the second node 530 is "high", the first inverter 525 outputs a "low" signal to the second inverter 540 and the third p-channel transistor 520. As a result, the third p-channel transistor 520 is activated and the second inverter 540 outputs a "high" signal through the sensing output line 550.

Thereafter, when the $\overline{ARPOR}$ input port 335 receives a "high" pulsed input, the second p-channel transistor 515 is deactivated. However, a conduction path is still established between the first and second nodes 510 and 530 since the third p-channel transistor 520 is active. As a result, the ASA continues to output a "high" signal with minimal power being used.

Alternatively, if the ASA is coupled to an unprogrammed memory cell as in the second ASA 314 of FIG. 5, the ASA operates quite differently. When the $\overline{ARPOR}$ input port receives a "low" pulsed input, a conduction path is established between the first and second nodes 510 and 530. However, since the unprogrammed memory cell, being also coupled to GND would force the VGND input port "low", the second node 530 is pulled "low" causing the first inverter 525 to output a "high" signal. As a result, the second inverter 540 outputs a "low" signal and the third p-channel transistor 520 remains deactivated.

Thereafter, when the $\overline{ARPOR}$ input port receives a "high" pulsed input, the second p-channel transistor 515 is deactivated thereby eliminating any type of conduction path between the first and second nodes 510 and 530. As a result, the second node 530 is pulled "low" to approximate GND.

Figure 8A:
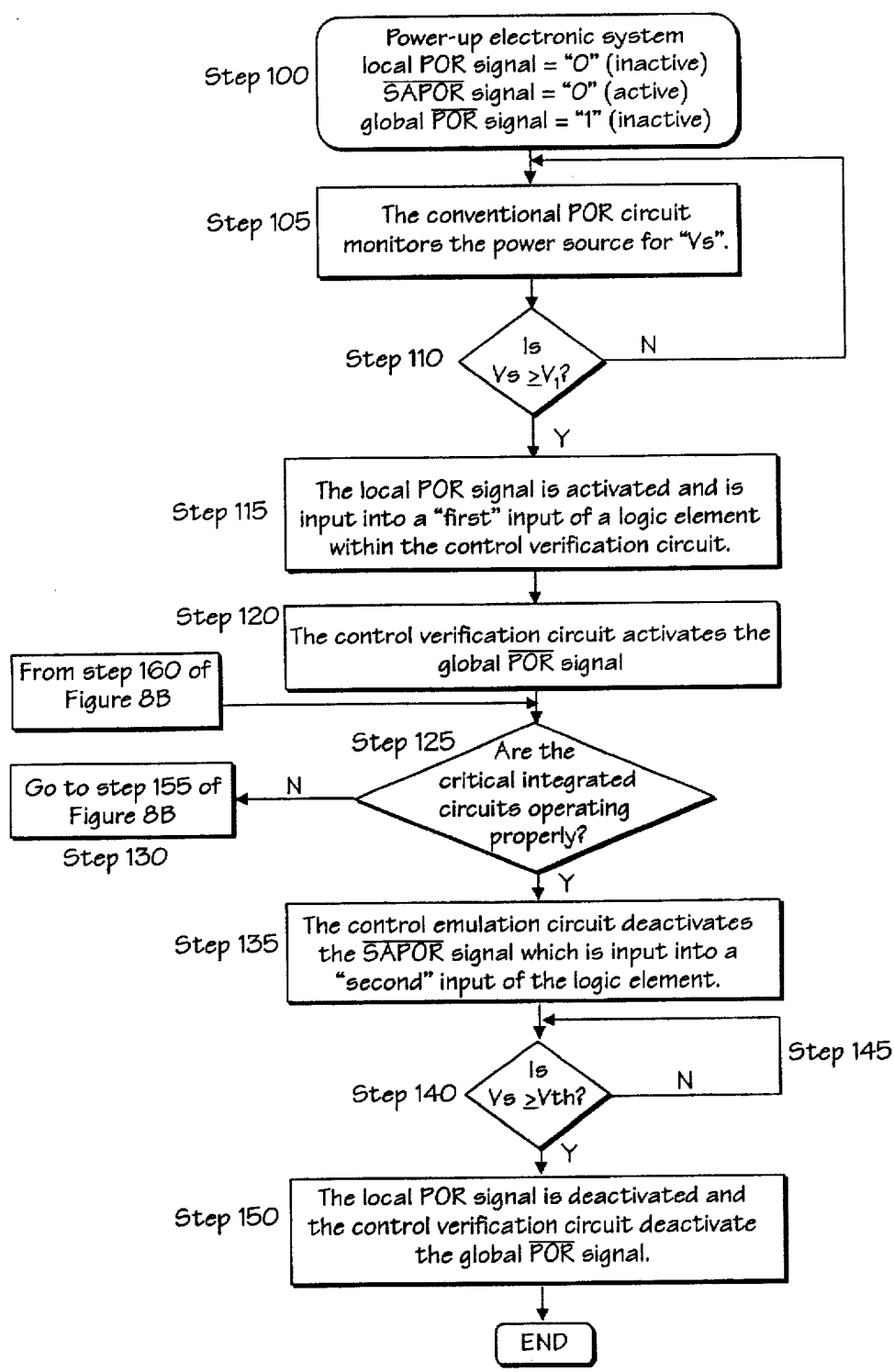
FIGS. 8A and 8B are flowcharts of the possible sequences of the power-on reset control circuit.
Figure 8B:
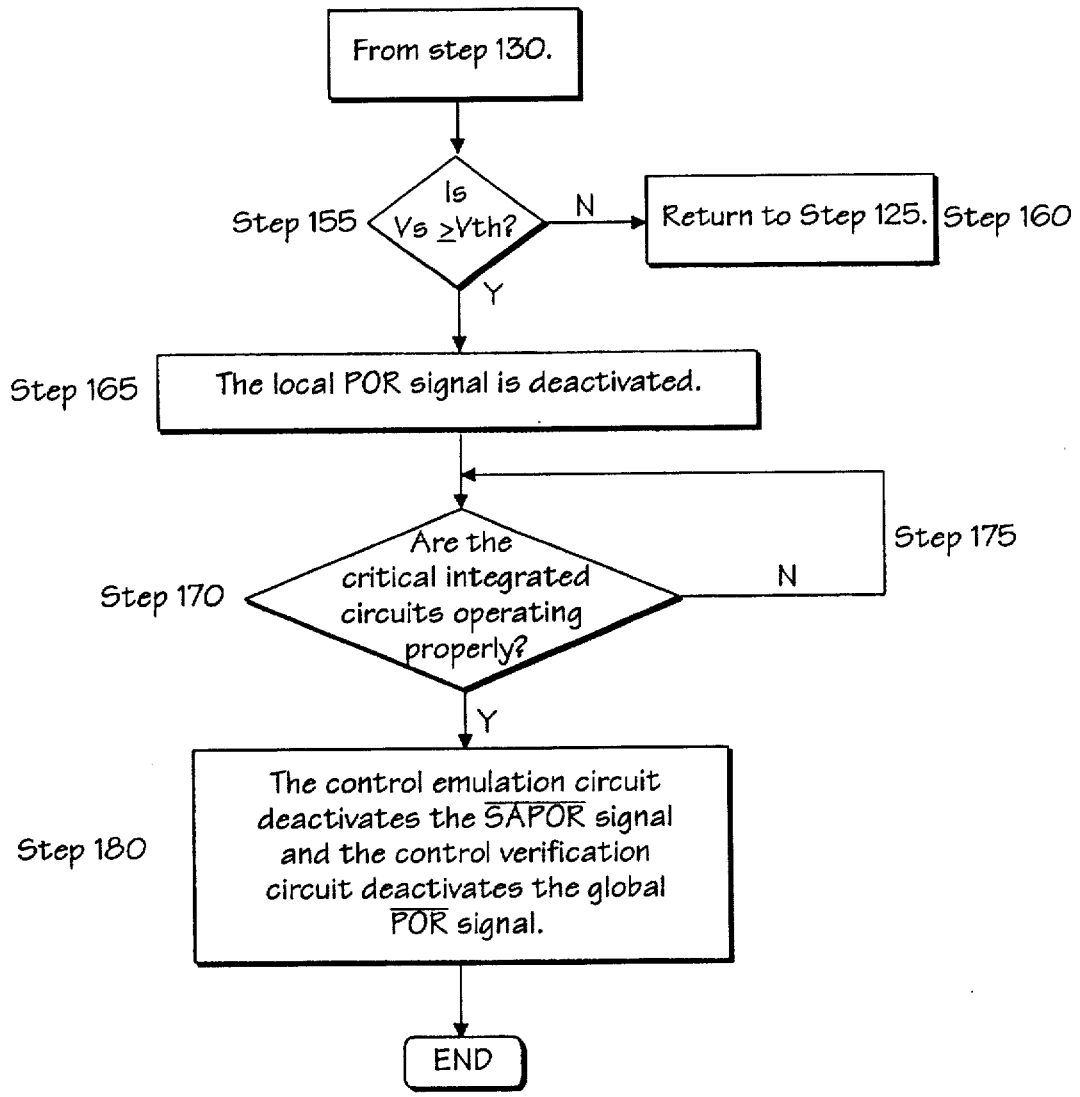

With respect to the illustrative embodiment of FIGS. 1–7, the power-on reset cycle can undergo two possible sequences as illustrated in FIGS. 8A and 8B. Both sequences are based on the correct operation of the critical integrated circuits which, as illustrated, are the sense amplifiers. For a first possible sequence, the critical integrated circuits are operating correctly prior to or exactly when the voltage supply reaches the threshold voltage "$V_{th}$". Alternatively, for a second possible sequence, the critical integrated circuits do not operate correctly until after the voltage supply reaches $V_{th}$.

With reference to the first sequence illustrated in FIG. 8A, the electronic component is powered-up (Step 100). As the voltage supply ramps up, the conventional POR circuit monitors the voltage supply to detect when it reaches a first voltage level ("$V_1$") (Step 105). Upon detecting that the voltage supply has reached $V_1$ (Step 110), the conventional POR circuit outputs a "high" local POR signal into a "set" input of an SR latch of the control verification circuit (Step 115). As a result, the SR latch is "set" forcing the SR latch to output an active global $\overline{POR}$ signal (Step 120), which is optionally complemented by second combinatorial logic element. Then, the control verification circuit monitors to detect whether the critical integrated circuits, represented in the control emulation circuit, are operating correctly i.e. whether the $\overline{SAPOR}$ signal is deactivated (Step 125).

If the control emulation circuit is still outputting an active $\overline{SAPOR}$ signal, the second sequence as shown in FIG. 8B, proceeds (Step 130). Otherwise, the control emulation circuit outputs a "high" signal into a "reset" input of the SR latch (Step 135). However, if the voltage supply still has not ramped up to the threshold voltage ($V_{th}$), the SR latch is not reset since the conventional power-on reset circuit has not deactivated its output (Steps 140–145). Once the voltage supply reaches $V_{th}$, the conventional power-on reset circuit outputs a "low" signal into the "set" input of the SR latch, causing the SR latch to deactivate the power-on-reset signal (Step 150).

With reference to the second sequence illustrated in FIG. 8B, the conventional POR circuit continues to monitor the voltage of the voltage supply to detect if $V_s \geq V_{th}$ (Step 155). If $V_s$ has not reached $V_{th}$, the second sequence returns to the first sequence (Step 125 of FIG. 8A) to re-check if the critical integrated circuits are now operating correctly (Step 160). If $V_s$ has reached $V_{th}$, the conventional POR circuit outputs a "low" signal into the "set" input of the SR latch (Step 165). However, the SR latch does not deactivate the global POR signal because the critical integrated circuits are not yet operating correctly (Steps 170–175) and therefore, the SR latch holds its previous state and the global $\overline{POR}$ signal remains active. Once the critical integrated circuits are operating properly i.e. the $\overline{SAPOR}$ signal is deactivated, the control emulation circuit outputs a "high" signal into a "reset" input of the SR latch, causing the SR latch to deactivate the global POR signal (Step 180).

It is important to note that for either sequence, the circuitry contained in the control emulation circuit must be operating correctly and the conventional POR circuit must detect that the voltage supply has reached the threshold voltage level before the power-on-reset cycle is completed.

Figure 9:
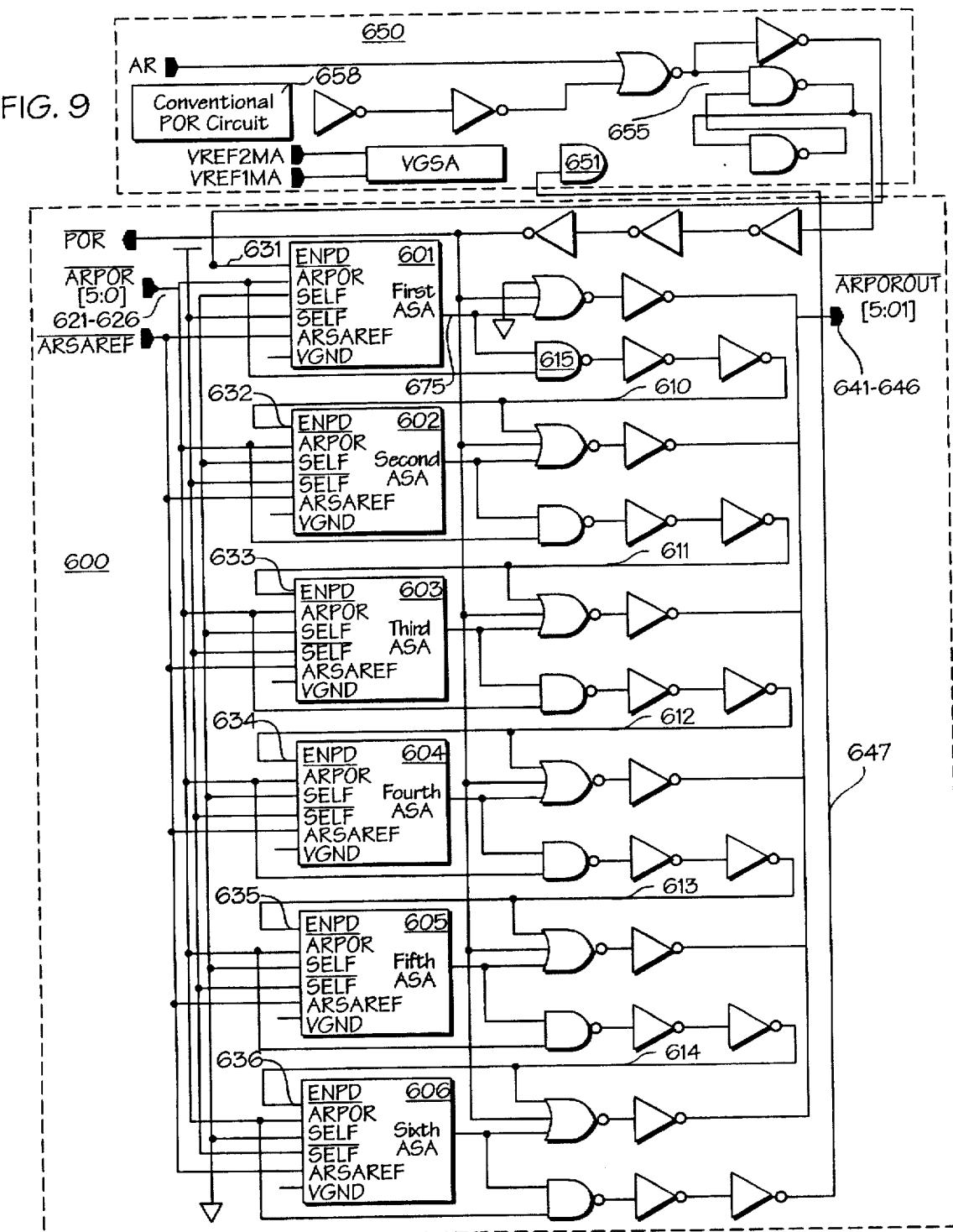
FIG. 9 is a schematic diagram of a second embodiment of the power-on reset control circuit having a number of ASAs cascaded together to reduce peak power.
Figure 10:
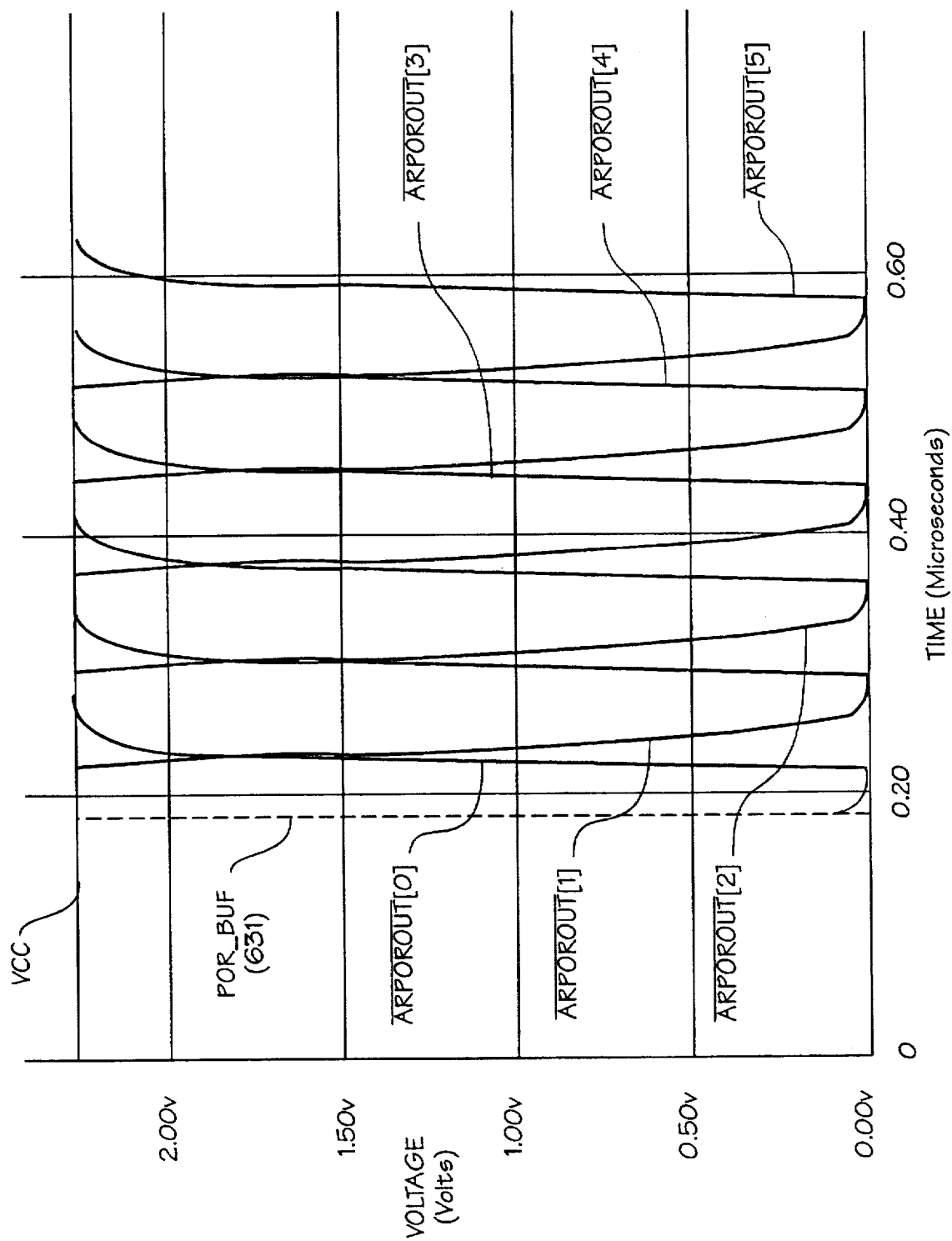
FIG. 10 is a timing chart of the phasing of the power-on reset control circuit illustrated in FIG. 9.

Referring now to FIGS. 9–11, another illustrative embodiment of the power-on-reset scheme typically employed in the 7C375 PLD is illustrated. This embodiment provides an example how the power-on reset control circuit may be employed in a sequence having a number of phases in order to limit power supply current surges during power-up. This power-up phased sequence may be accomplished for ASAs by cascading the ASAs together as shown in FIG. 9 and slightly altering its internal circuitry as shown in FIG. 11. However, it is contemplated that the power-up phased sequence can be utilized to control any number and type of critical integrated circuits.

In FIG. 9, the control emulation circuit 600 is modified by incorporating a plurality of ASAs 601–606 in series through buffered signal lines 610–614. Both a first ARPOR signal line 621 and an output line 675 of the first ASA 601 are coupled to a first NAND gate 615 which, in turn, is coupled to an enable pull-down ("ENPD") input port 632 of the second ASA 602 through the first buffered signal line 610. Similar types of coupling are employed between the second and third ASAs 602 and 603, third and fourth ASAs 603 and 604 and so on.

For each ASA 601–606, its corresponding $\overline{ARPOR}$ signal line 621–626 is coupled to its corresponding output $\overline{ARPOROUT}$ signal lines 641–646. This ensures that the $\overline{ARPOROUT}$ signal from a particular ASA 602–606 is not deactivated until that ASA 602–606 senses a logic "1", its ENPD input port 632–636 is a logic "0" and the global $\overline{POR}$ signal is activated. The exception applies to the first ASA 601 because it is the first in the chain and its $\overline{ARPOROUT}$ signal is activated at the beginning of the local POR signal from the conventional POR circuit. In this embodiment, combinatorial logic is provided to ensure that only one $\overline{ARPOROUT}$ signal is activated at a time since an $\overline{ARPOROUT}$ signal for a prior ASA must be deactivated before an $\overline{ARPOROUT}$ signal for a current ASA is activated.

The global POR signal is not deactivated until a last ASA (i.e., a sixth ASA 606) has sensed that its $\overline{ARPOROUT}$ signal has been deactivated. This deactivated $\overline{ARPOROUT}$ signal is input into the control verification circuit 650 through a sequence input line 647. Relying on the deactivated $\overline{ARPOROUT}$ signal being input into a slave NAND gate 651 of a SR latch 655 in combination with the VGSA which emulates sensing of the main memory array to complete this power-up phased sequence ensures that all of the critical circuitry is functioning properly before the global $\overline{POR}$ signal is deactivated.

Unlike the power-up sequence of the first illustrative embodiment, this power-up sequence utilizes delay time between the first and second trip voltages (i.e. $V_1$ and $V_{th}$) to hold the ASA outputs at an invalid state (i.e. logic level "1") because the global $\overline{POR}$ signal is activated and the ASAs are configured as being associated with programmed memory cells. Once the power supply reaches $V_{th}$, the ENPD input 631 of the first ASA 601 is released allowing a valid state (logic "1") to be achieved. Each subsequent ASA is dependent on the state of the previous ASA as shown in FIG. 10.

Referring to FIG. 11, a schematic diagram of an embodiment of the first ASA 601, for example, employed in the control emulation circuit 600 is illustrated. This embodiment of the first ASA 601 is similar to the first embodiment shown in FIG. 7, except for two design changes. The first change is that a second n-channel transistor 665 is serially coupled at its drain to a drain of the second p-channel transistor 670 and at its source to GND 140 in order to force the ASA output 675 to an invalid state (logic "0") for the initial phase of the power-up sequence after reaching the first trip voltage "$V_1$". Upon the voltage supply reaching $V_{th}$, a "low" signal is transmitted into an enable pull-down ("ENPD") input port 601 of the first ASA 601 which deactivates the second n-channel channel transistor 665 to release the second node 680 "high". The second design change is transform the override circuit 685 to only include the first CMOS transmission gate 690. It is contemplated that the configuration of the first ASA 601 discussed above is applicable to all ASAs 601–606.

The present invention described herein may be designed in many different embodiments evident to one skilled in the art than those described without departing from the spirit and scope of the present invention. The invention should, therefore be measured in terms of the claims which follow.

What is claimed is:

1. A power-on reset control circuit comprising:

a control emulation circuit including a plurality of integrated circuits cascaded together and capable of transmitting a control signal from a last one of the plurality of integrated circuits on a control line to indicate that the plurality of integrated circuits are operating correctly; and a control verification circuit coupled to said control emulation circuit through said control line, wherein said control verification circuit is capable of deactivating a global power-on reset signal upon receiving both an inactive local power-on reset signal indicating that a power source is providing a voltage at an operating threshold level, and said control signal in an inactive state.

2. A computer system comprising:

processor means for processing information within said computer system;

memory means for storing data to control the processing performed by said processor means;

a first bus means coupled between said memory means and said processing means for transferring information between at least said memory means and said processor means;

peripheral means for performing a selected operation, said peripheral means being coupled to a second bus means;

a controlling means for enabling information to be transferred between said first and second bus means, said controlling means including a first plurality of integrated circuits reset by an active global power-on reset signal and at least one integrated circuit functioning independently of the power-on reset signal, a power-on reset control circuit coupled to a power source providing a ramping voltage following power up, the power-on reset control circuit comprising:

a control emulation circuit including a plurality of integrated circuits cascaded together and capable of transmitting a control signal from a last one of the plurality of integrated circuits through a first control line to indicate that the plurality of integrated circuits are operating correctly; and a control verification circuit coupled to said control emulation circuit through said first control line, wherein said control verification circuit is capable of deactivating the global power-on reset signal upon receiving both an inactive local power-on reset signal indicating that the power source is providing a voltage at an operating threshold level, and said control signal in an inactive state.

3. The computer system according to claim 2, wherein the emulation circuitry includes a sense amplifier.

4. The computer system according to claim 2, wherein said control verification circuit includes a power-on reset generation circuit capable of deactivating said local power-on reset signal upon detecting that the power source is providing said operating threshold voltage.

5. The computer system according to claim 4, wherein said control verification circuit further includes a logic element having first and second input ports, said power-on reset generation circuit being coupled to said first input port through a power-on reset line for enabling transmission of said local power-on reset signal into said first input port and said control emulation circuit being coupled to said second input port through said first control line.

6. The computer system according to claim 5, wherein said logic element includes a set-reset latch with said first input port setting said set-reset latch and said second input port resetting said set-reset latch.

7. The power-on reset control circuit of claim 1, wherein the plurality of integrated circuits are cascaded together to limit current of the power supply during activation of the global power-on reset signal.

* * * * *